Patented Oct. 22, 1929

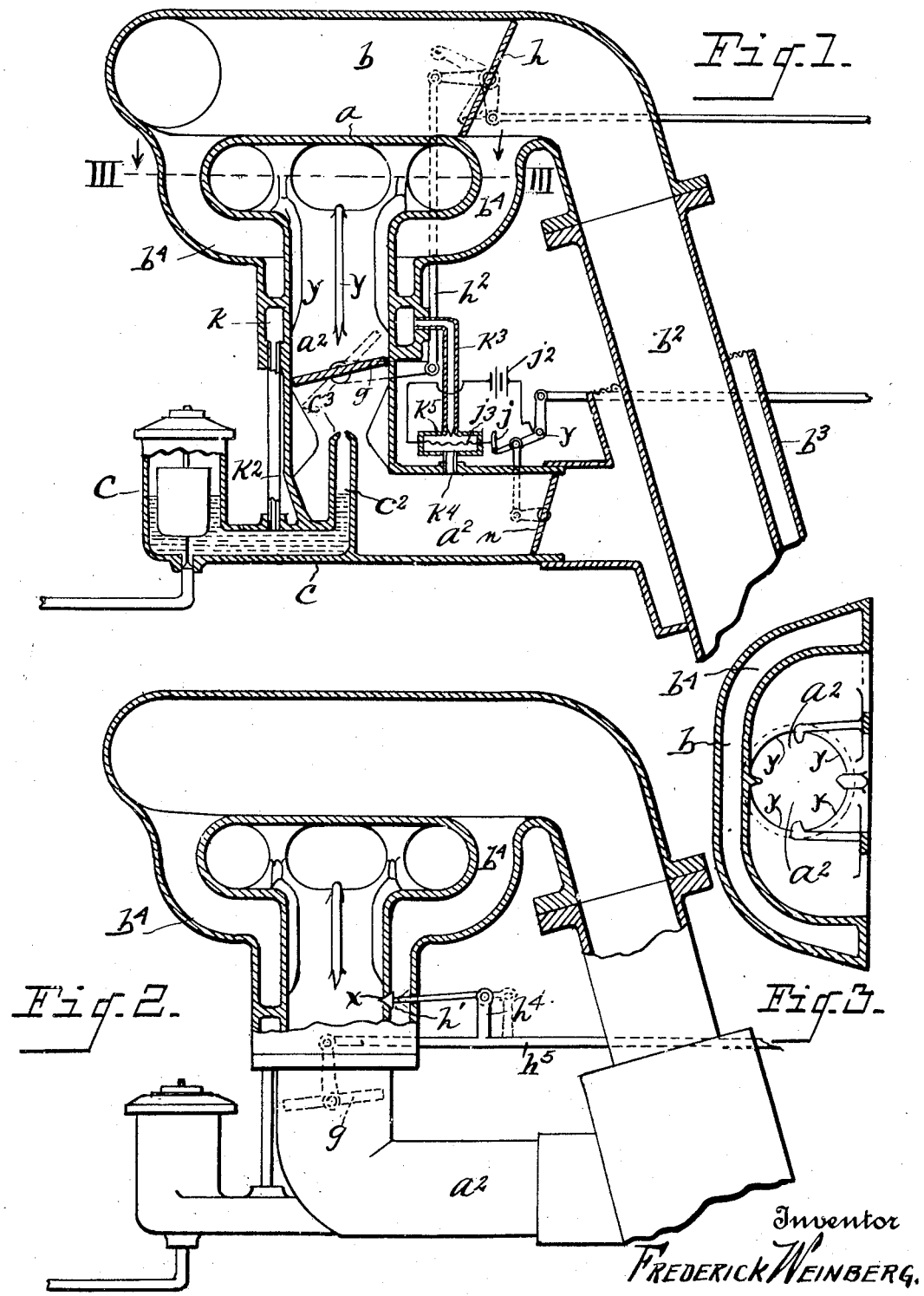

1,732,251

UNITED STATES PATENT OFFICE

FREDERICK WEINBERG, OF DETROIT, MICHIGAN

FEED APPARATUS FOR INTERNAL-COMBUSTION ENGINES

Application filed July 28, 1920. Serial No. 399,619.

My invention relates to feed apparatus for internal combustion engines. An object of my invention is to provide a heating apparatus for the intake manifold to secure the ability to vary the degree of heat of the charge in accordance with the requirements of the motor at different speeds and loads. The charge requires the greatest amount of heat at the lower throttle opening, but at the higher throttle opening less heat is required and should be applied to secure the best volumetric efficiency of the engine. Another object of my invention is to efficiently distribute the charge by increasing the intake manifold surface and by providing grooves in such surface.

Still another object of my invention is to facilitate easy starting by providing an electrically heated by-pass which however, only becomes operative upon closing the choke of the carburetor.

In the accompanying drawings:—

Fig. 1 is a sectional elevation of an apparatus embodying my invention.

Fig. 2 is a view similar to Fig. 1 illustrating a modified form.

Fig. 3 is a detail sectional view the section being taken on the line III—III Figure 1.

$a$ is the intake manifold to an internal combustion engine having the intake pipe $a^2$. $b$ is the exhaust manifold. $b^4$ is a passage communicating at each end with the exhaust manifold $b$ and passing around the intake manifold $a$. $b^2$ is the discharge, or exhaust pipe leading from the exhaust manifold $b$ and $b^3$ is a heating jacket surrounding the exhaust pipe $b^2$. $c$ is the carburetor having a nozzle $c^2$ extending upward into said intake pipe and provided at its upper end with a discharge aperture $c^3$.

$g$ is the throttle valve in the intake manifold. $h$ is a throttle valve located in the exhaust pipe intermediate the ends of the passage $b^4$. Thus when the throttle valve $h$ is turned to obstruct the passage of the exhaust gases at the point at which it is located, said gases are forced thru the by-pass passage $b^4$ to heat the incoming charge in the intake manifold $a$.

The operating arm of the exhaust valve $h$ is connected by a link $h^2$ with the operating arm of the throttle valve $g$.

$n$ is a conventional choke valve near the entrance to the passage $a^2$. $j$ is a switch, an operating arm of which is connected with an operating arm of the choke valve $n$.

$k^2$ is a conduit leading upward from the passage containing the nozzle $c^2$. $k$ is a chamber adjoining passage $b^4$ thru which passage the hot exhaust gases pass. The conduit $k^2$ communicates at its upper end with the chamber $k$. $k^3$ is a pipe leading from the chamber $k$ and communicating at $k^4$ with the intake passage inside the choke $n$. $k^5$ is an enlargement of the conduit or pipe $k^3$.

$j^3$ is an electric heating means in the enlargement $k^5$. $j^2$ is a battery or source of electricity. When the choke $n$ is closed the switch $j$ is closed and the circuit thru the heating wire $j^3$ is completed.

The operation of the above-described device is as follows:

When the engine is started, the choke is closed or partly closed and the circuit is completed thru the heating wire $j^3$. There is then a strong vacuum formed in the intake pipe which draws liquid fuel thru the conduit $k^2$ into the heating chamber $k$, thence thru the conduit $k^3$ and past the heating wire $j^3$, so that the fuel is delivered to prime the engine in a heated and readily vaporizable condition. When the engine has started the choke $n$ is opened and the circuit is broken. The fuel is then drawn upward thru nozzle $c^2$ in a well-known manner. In this position the intake throttle $g$ is nearly closed and the exhaust valve $h$ is closed and hot gasses are forced thru the passage $b^4$ to heat the intake manifold $a$, the intake pipe $a^2$ and the fuel chamber $k$. Any operation of the intake throttle $g$ causes the actuation of the exhaust valve $h$ because they are connected by the link $h^2$, and when the inlet throttle is open the exhaust valve is open and the exhaust gas goes directly to $b^2$ without heating the intake manifold appreciably.

In the modification of Fig. 2, I have shown an aperture thru the wall of the intake pipe $a^2$ and communicating with the chamber or passage $b^4$. Thus the suction in the intake manifold will draw a portion of the exhaust gases into the chamber or passage $b^4$.

Exhaust valve $h$ takes here the form of valve $h^1$ closing the passage $x$ only when the throttle is closed the valve $h'$ is carried by arm $h^4$ which is carried by rod $h^5$ which actuates the throttle valve $g$. When the throttle is opened, exhaust throttle valve $h'$ will be opened. Different degrees of heating of the intake manifold are automatically produced by the vacuum in the intake manifold, the latter being greatest when the throttle is closed and less as it opens. This sucks in a proportionate volume of the exhaust gases.

To insure equal distribution of the fuel, the inside walls of the intake manifold are provided with grooves $y$. Figure 3 shows a cross-section of the manifold for the four cylinder engine. The grooves form distributing channels leading to the ports of the respective intake valves. In this way each cylinder will draw its apportioned amount of fuel regardless of gas shifts which may be set up in the manifold. In other words, the fuel or the air is handled separately and once the fuel has precipitated on the walls and has found its way into the grooves, then it runs along the latter until it reaches its point of destination, that is, the cylinder.

What I claim is:

1. In an internal combustion engine having a multiplicity of combustion chambers communicating with the fuel intake manifold having a valve-controlled inlet, an exhaust communicating with said combustion chambers having a main outlet and having a portion disposed in proximity the fuel intake so that the products of combustion in said portion will heat the intake, and means disposed in the exhaust operatively co-ordinated with the movement of the valve in the inlet to the intake to increase the flow of exhaust products of combustion through that portion of the exhaust disposed in proximity to the intake in inverse proportion to the opening of said valve, and means in the intake leading from the inlet thereto to the points of discharge into the separate combustion chambers adapted to direct the flow of fuel condensing therein into the separate chambers.

2. In an internal combustion engine having a multiplicity of combustion chambers communicating with a fuel intake manifold having a main inlet and discharge outlets leading to the separate combustion chambers, said intake manifold having grooves formed on its surface leading from the inlet to the discharge outlets into the separate combustion chambers to direct the flow of fuel condensing adjacent the inlet into separate combustion chambers.

3. In an internal combustion engine, a fuel intake, an air intake leading to the fuel intake, a throttle valve in the fuel intake, a choke valve in the air intake, an exhaust for products of combustion, a heater disposed in proximity to the intake to heat the same and communicating with the exhaust to receive the exhaust gases therefrom, a valve in said exhaust to direct the exhaust gases through said heater, said valve operatively connected with the throttle valve to open and close therewith, a by-pass extending from the carburetor to the intake terminating intermediate the throttle and the choke valves, an electrical heater adapted to heat the fuel passing through the by-pass, said electrical heater operatively connected with the choke valve for operation upon closing of the choke.

4. In an internal combustion engine, an intake having a fuel inlet and an air inlet, a throttle valve in the intake, a choke valve in the air inlet, an exhaust for the products of combustion, a heater communicating with the exhaust to receive exhaust gases therefrom and disposed in proximity the intake to heat the same, a valve in the exhaust adapted to direct the flow of exhaust gases through said heater said valve operatively connected with the throttle valve to increase the flow of exhaust gases through the heater in inverse proportion to the opening of the throttle valve, a heater to heat the fuel passing through the intake which heater is operatively connected with the choke valve to be placed in the operative position upon the closing of the choke valve and in the inoperative position upon the opening thereof.

5. In an internal combustion engine, an intake having a fuel inlet and an air inlet, a throttle valve in the intake, a choke valve in the air inlet, an exhaust for the products of combustion, a heater communicating with the exhaust to receive exhaust gases therefrom and disposed in proximity the intake to heat the same, a valve in the exhaust adapted to direct the flow of exhaust gases through said heater said valve operatively connected with the throttle valve to increase the flow of exhaust gases through the heater in inverse proportion to the opening of the throttle valve, a secondary fuel inlet to the intake, a heater arranged to heat the fuel passing therethrough, said heater operatively connected with the choke valve to be placed in the operative position upon closing of the choke and in the inoperative position upon the opening of the same.

6. The combination, in a multi-cylinder engine, of a carburetor, an intake extending from the carburetor to the engine and provided with a manifold structure communicating with the several cylinders of the engine, said intake provided with ribs extending partly into the manifold structure and dividing it into grooves leading to the several cylinders, said grooves being in communication with each other.

7. In an internal combustion engine, a fuel intake, an air intake leading to the fuel intake, a throttle valve in the fuel intake, a choke valve in the air intake, an exhaust for products of combustion, a heater disposed in proximity to the intake to heat the same and communicating with the exhaust to receive the exhaust gases therefrom, a bypass adjacent to said heater to receive the heat therefrom, extending from the carburetor and terminating intermediate the throttle and the choke valves into the intake passage for the purpose described.

In testimony whereof I sign this specification.

FREDERICK WEINBERG.